(12) United States Patent
Kim (10) Patent No.: US 12,071,261 B2
(45) Date of Patent: Aug. 27, 2024

(54) DRONE DOCKING/LANDING SYSTEM

(71) Applicant: Korea Aerospace Research Institute, Daejeon (KR)

(72) Inventor: Sung Yug Kim, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 3 days.

(21) Appl. No.: 17/991,338

(22) Filed: Nov. 21, 2022

(65) Prior Publication Data

US 2023/0159184 A1    May 25, 2023

(30) Foreign Application Priority Data

Nov. 23, 2021 (KR) .................. 10-2021-0162609

(51) Int. Cl.
| | |
|---|---|
| *B64F 1/22* | (2024.01) |
| *B64C 39/02* | (2023.01) |
| *B64C 29/00* | (2006.01) |
| *B64U 10/13* | (2023.01) |
| *B64U 70/00* | (2023.01) |

(52) U.S. Cl.
CPC .............. *B64F 1/22* (2013.01); *B64C 39/024* (2013.01); *B64C 29/0008* (2013.01); *B64C 39/02* (2013.01); *B64U 10/13* (2023.01); *B64U 70/00* (2023.01)

(58) Field of Classification Search
CPC .... B64F 1/22; B64F 1/00; B64F 1/007; B64F 1/02; B64F 1/125; B64F 1/222; B64C 39/024; B64C 29/0008; B64C 39/02; B64C 2025/325; B64U 10/13; B64U 70/00; B64U 80/00; B64U 60/50; B64U 70/93; B64U 70/95; B64U 70/97; B64U 80/86

See application file for complete search history.

(56) References Cited

U.S. PATENT DOCUMENTS

| | | | |
|---|---|---|---|
| 2015/0069968 A1* | 3/2015 | Pounds ................... | B60L 53/35 320/109 |
| 2018/0196418 A1 | 7/2018 | Meier et al. | |

FOREIGN PATENT DOCUMENTS

| | | | | |
|---|---|---|---|---|
| KR | 20200118518 A | * | 10/2020 | ............. B60L 53/38 |
| KR | 20210073631 A | | 6/2021 | |

(Continued)

OTHER PUBLICATIONS

WO-2021118019-A1 Translation (Year: 2020).*

(Continued)

*Primary Examiner* — Richard Green
*Assistant Examiner* — Steven J Shur
(74) *Attorney, Agent, or Firm* — Panitch Schwarze Belisario & Nadel LLP (57) ABSTRACT

A drone docking/landing system includes: a docking portion having a shape of any one of a polygonal pyramid, a truncated polygonal pyramid, a cone, and a truncated cone and being capable of docking a drone; and a landing portion mounted at a lower portion of the drone, having a lower portion that is open, into which the docking portion is inserted, and having an empty inner space, wherein the landing portion has a shape of any one of a polygonal pyramid, a truncated polygonal pyramid, a cone, and a truncated cone, wherein the shape corresponds to the shape of the docking portion so that the docking portion is inserted into the landing portion.

12 Claims, 9 Drawing Sheets

(56) References Cited

FOREIGN PATENT DOCUMENTS

| WO | 2017139000 A1 | 8/2017 | |
| WO | WO-2021118019 A1 * | 6/2021 | .............. B60L 53/30 |

OTHER PUBLICATIONS

KR-20200118518-A Translation (Year: 2020).*
Request for the Submission of an Opinion, dated May 19, 2023, issued in corresponding Korean Application No. 10-2021-0162609, 12 pgs.

* cited by examiner

DRONE DOCKING/LANDING SYSTEM

CROSS-REFERENCE TO RELATED APPLICATION

This application is based on and claims priority under 35 U.S.C. § 119 to Korean Patent Application No. 10-2021-0162609, filed on Nov. 23, 2021, in the Korean Intellectual Property Office, the disclosure of which is incorporated by reference herein in its entirety.

BACKGROUND

1. Field

One or more embodiments relate to a docking/landing system for a vertical take-off and landing drone, and more particularly, to a drone docking/landing system for having a drone stably take off and land by providing a landing portion having a horned or a pyramidal shape at a lower portion of the drone and mounting and aligning the landing portion of the drone on a docking portion having a horned or a pyramidal shape.

2. Description of the Related Art

An unmanned plane, such as a drone, appeared at early 1970's and has developed into a military pilotless aircraft. Early drones were used as objects for a missile bombing practice by an air force, but the usage of drones has eventually expanded. Currently, a vertical take-off and landing drone is used not only for a military purpose, but also for individual, media, and enterprise purposes. Also, as drones have been developed to have various shapes, the usage of the drones has been diversified.

To have the vertical take-off and landing drone take off and land, a landing place or a landing pad has been used. As the use purposes, operation regions, etc. of the drones recently have been diversified, the need for forming a landing pad of a drone at various positions, such as above and beside a vehicle, a vessel, a structure, or the like, in addition to the ground, has emerged.

Figure 1:
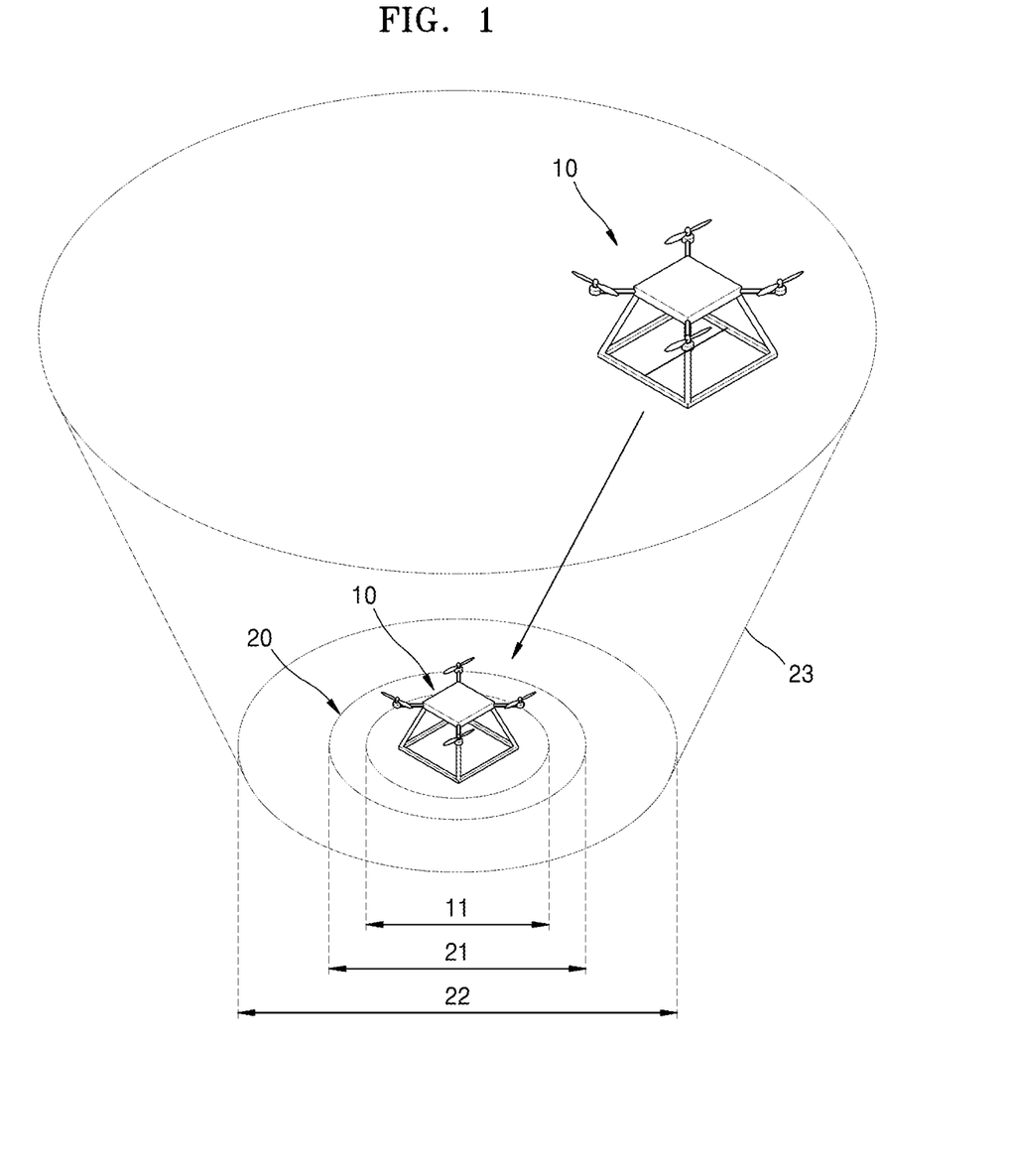
FIG. 1 is a diagram showing an area of a landing pad, a landing approaching area, and a landing approaching minimum space required for landing of a drone.

However, to form the landing pad of the drone at various positions has the following problems. Referring to FIG. 1, an area 21 of a landing pad 20 for allowing the drone 10 to land may have various sizes depending on an area 11 of the drone 10 and the performance of the drone 10, but the area 21 of the landing pad 20 has to be greater than the area 11 of the drone 10.

Also, referring to FIG. 1, to form the landing pad 20, a landing access area 22 that is greater than the area 21 of the landing pad 20 has to be obtained by taking into account effects of a peripheral obstacle, and to allow the drone 10 to approach the landing pad 20 without the effects of the peripheral obstacle, a landing approaching minimum space 23 has to be secured.

As described above, a large area is required in order to form the landing pad 20 for a take-off and landing of the drone 10, and accordingly, an area required for forming the landing pad 20 may be increased.

Also, when a landing pad is formed in a place, such as a vehicle or vessel, where there are external movements, a separate lashing (fixing) or aligning device for lashing (fixing) or aligning a drone is additionally needed in order to prevent the detachment of the drone from the landing pad due to the external movements.

SUMMARY

One or more embodiments include a drone docking/landing system which allows for a stable take-off and landing of a drone by providing a landing portion of a horned or a pyramidal shape at a lower portion of the drone and mounting and aligning the landing portion of the drone on a docking portion of a horned or a pyramidal shape.

Additional aspects will be set forth in part in the description which follows and, in part, will be apparent from the description, or may be learned by practice of the presented embodiments of the disclosure.

According to one or more embodiments, a drone docking/landing system includes: a docking portion having a shape of any one of a polygonal pyramid, a truncated polygonal pyramid, a cone, and a truncated cone and being capable of docking a drone.

The drone docking/landing system may further include a landing portion mounted at a lower portion of the drone, having a lower portion that is open, into which the docking portion may be inserted, and having an empty inner space, wherein the landing portion may have a shape of any one of a polygonal pyramid, a truncated polygonal pyramid, a cone, and a truncated cone, wherein the shape corresponds to the shape of the docking portion so that the docking portion may be inserted into the landing portion.

The docking portion may have a truncated quadrangular pyramidal shape, and the landing portion may have a truncated quadrangular pyramidal shape, a lower portion of which is open, so that the docking portion may be inserted into the landing portion.

A size of a lower surface of the docking portion may be the same as a size of a lower surface of the open lower portion of the landing portion.

The drone docking/landing system may further include a connection portion having a rod shape and connected with the docking portion.

The connection portion may include a fixed portion fixed at a designated point and a moving portion configured to upwardly and downwardly move with respect to the fixed portion, and the docking portion may be connected with the moving portion and may be configured to upwardly and downwardly move with respect to the fixed portion.

A connection joint may be provided at an upper portion of the moving portion, and a connection shaft may be provided at an outer portion of the connection joint, the connection shaft having a bar shape and connecting the connection joint with the docking portion.

The drone docking/landing system may further include a landing pad to which the connection portion is coupled.

The connection portion in a multiple number may be coupled to the landing pad, and the landing pad may be configured to be movable.

The connection portion may be configured to upwardly and downwardly move with respect to the landing pad, and the docking portion may be connected with the connection portion and may be configured to upwardly and downwardly move with respect to the landing pad.

A landing guidance sensor configured to transmit a guidance signal to the drone may be provided at an upper portion of the docking portion.

A detachment prevention bump extending in an outer direction of the docking portion and having an upwardly inclined end may be provided at an outer portion of the docking portion.

The drone docking/landing system may further include a first actuator configured to rotate an inclination of the docking portion with respect to a first axis extending in a direction parallel with a plane formed by a lower surface of the docking portion.

The drone docking/landing system may further include a second actuator configured to rotate the inclination of the docking portion with respect to a second axis extending in a direction parallel with the plane formed by the lower surface of the docking portion, wherein the first axis and the second axis may be perpendicular to each other.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

In this specification, principles of the disclosure are described and embodiments are disclosed, in order to clarify the scope of the claims of the disclosure and clearly convey the disclosure for one of ordinary skill in the art to implement the disclosure. Embodiments may be implemented in various forms.

The terms "comprises" or "comprising" used in various embodiments of the disclosure specify the presence of disclosed functions, operations, components, or the like, but do not preclude the addition of one or more functions, operations, components, or the like. It will be further understood that the terms "comprises" or "comprising" used herein specify the presence of stated features, integers, steps, operations, members, components, and/or groups thereof, but do not preclude the presence or addition of one or more other features, integers, steps, operations, members, components, and/or groups thereof.

When it is described that one or more components are "connected" or "coupled" to another component, it should be understood that the one or more components may be directly connected or coupled to the other component, but other intervening components may also be present between the one or more components and the other component. In contrast, when an element is referred to as being "directly on," "directly connected to" or "directly coupled to" another element or layer, there are no intervening elements or layers present.

Although the terms first, second, etc. used in this specification may be used herein to describe various elements, these terms do not limit the components. These terms are only used to distinguish one element from another.

One or more embodiments relate to a drone docking/landing system, and more particularly, to a drone docking/landing system for allowing a drone to stably take off and land by providing a landing portion having a horned or a pyramidal shape at a lower portion of the drone and mounting and aligning the landing portion of the drone on a docking portion having a horned or a pyramidal shape. Hereinafter, embodiments will be described in detail with reference to the accompanying drawings.

The drone according to an embodiment may include various types of flight vehicles performing vertical take-off and landing. Hereinafter, an embodiment will be described in detail based on the drone.

The drone docking/landing system according to an embodiment may include a docking portion 110.

Figure 2:
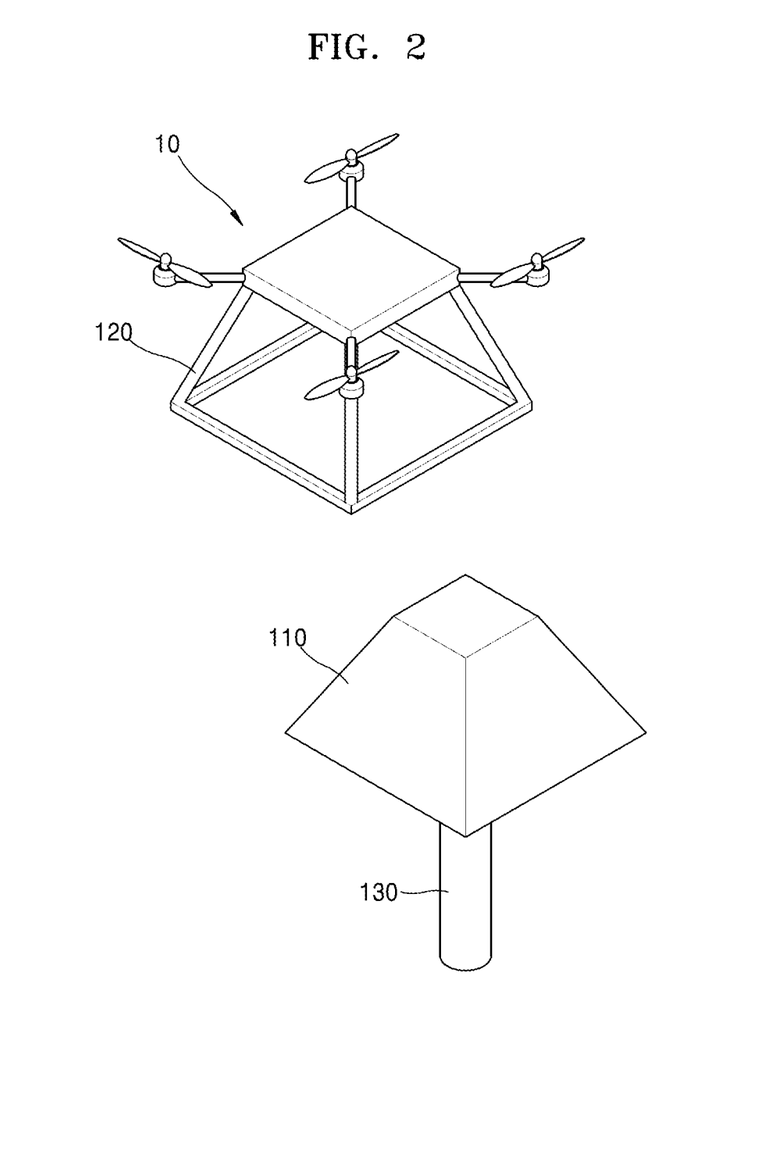
FIG. 2 is a diagram showing a drone docking/landing system according to an embodiment.

Referring to FIG. 2, the docking portion 110 may have a shape of any one of a polygonal pyramid, a truncated polygonal pyramid, a cone, and a truncated cone, and a drone 10 may be docked on the docking portion 110. The docking portion 110 according to an embodiment may desirably have a shape of a quadrangular pyramid, but is not limited thereto. The docking portion 110 may have a shape of any one of a polygonal pyramid, a truncated polygonal pyramid, a cone, and a truncated cone.

The drone docking/landing system according to an embodiment may further include a landing portion 120.

Figure 3A:
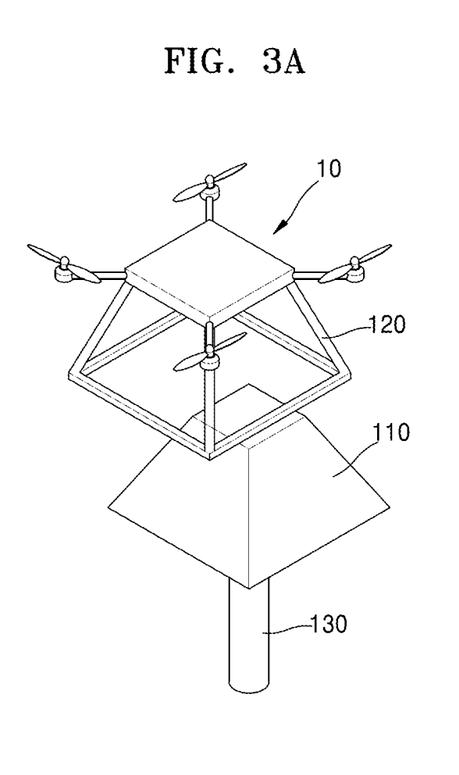
FIG. 3A is a diagram showing a process in which a landing portion of a drone is mounted on a docking portion, according to an embodiment.
Figure 3B:
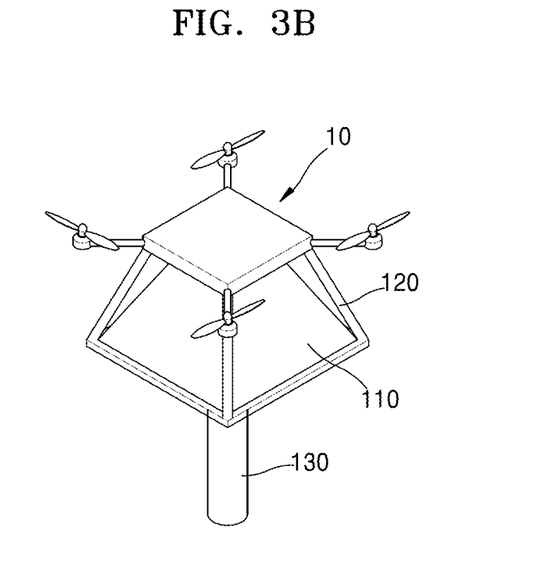
FIG. 3B is a diagram showing a process in which the landing portion of the drone is mounted and aligned on the docking portion, according to an embodiment.

The landing portion 120 may be mounted at a lower portion of the drone 10 and may have a lower portion that is open, into which the docking portion 110 may be inserted, and may have an inner empty space. Referring to FIGS. 3A and 3B, the landing portion 120 may approach an upper position of the docking portion 110 to land the drone 10.

When the landing portion 120 draws near to the upper position of the docking portion 110, the docking portion 110 may be inserted into the landing portion 120 through the open lower portion of the landing portion 120, and the docking portion 110 may be mounted in the inner empty space of the landing portion 120.

The landing portion 120 may have a shape of any one of a polygonal pyramid, a truncated polygonal pyramid, a cone, and a truncated cone, and the landing portion 120 may have the shape corresponding to the shape of the docking portion 110 so that the docking portion 110 may be inserted into the landing portion 120. That is, the landing portion 120 and the docking portion 110 may have the same shape as each other.

In detail, referring to FIG. 2, FIG. 3A, and FIG. 3B, the docking portion 110 may have a truncated quadrangular pyramidal shape, and the landing portion 120 may have a truncated quadrangular pyramidal shape having an open lower portion, into which the docking portion 110 may be inserted.

As shown above, because the landing portion 120 and the docking portion 110 may have the same shape as each other, the landing portion 120 may be mounted on the docking portion 110, and as the landing portion 120 may be mounted on the docking portion 110, the drone 10 may be landed.

According to an embodiment, a size of a lower surface of the docking portion 10 may be the same as a size of a lower surface of the open lower portion of the landing portion 120. When the size of the lower surface of the docking portion 110 is the same as the size of the lower surface of the open lower portion of the landing portion 120, the landing portion 120 may be aligned along a side surface of the docking portion 110 when the drone 10 lands above the docking portion 110.

When the landing portion 120 is aligned by the docking portion 110, the drone 10 may be prevented from moving, after the drone 10 is completely landed. Accordingly, the drone 10 may be lashed (fixed) without an additional device.

The drone docking/landing system according to an embodiment may include the landing portion 120, but is not limited thereto. The drone docking/landing system according to an embodiment may omit the landing portion 120 provided in the drone 10.

Figure 4:
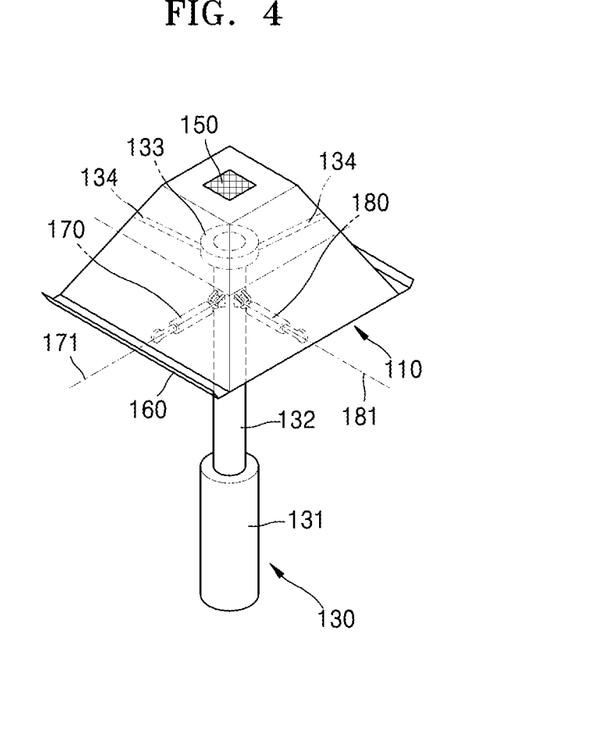
FIG. 4 is a perspective view of a docking portion according to an embodiment.

Referring to FIG. 4, a drone docking/landing system according to an embodiment may include a connection portion 130 having a rod shape and connected with the docking portion 110. The connection portion 130 may have the rod shape, and the docking portion 110 may be coupled to a landing pad 140 to be described below through the connection portion 130.

According to an embodiment, the connection portion 130 may include a fixed portion 131 fixed to a designated point and a moving portion 132 capable of an upward and downward movement with respect to the fixed portion 131.

The docking portion 110 may be configured to upwardly and downwardly move through the moving portion 132. In detail, the docking portion 110 may be connected with the moving portion 132, and thus, may be configured to upwardly and downwardly move with respect to the fixed portion 131.

Because the docking portion 110 may be capable of an upward and downward movement through the moving portion 132, a height of the docking portion 110 may be adjusted. By adjusting the height of the docking portion 110, a height at which the drone 10 is landed may be adjusted, to prevent effects of peripheral obstacles on the take-off and landing of the drone 10.

Referring to FIG. 4, the moving portion 132 may be connected with the docking portion 110 through a connection joint 133 and a connection shaft 134. The connection joint 133 may be provided at an upper portion of the moving portion 132, and the connection shaft 134 may have a bar shape and may be provided at an outer portion of the connection joint 133.

Figure 5A:
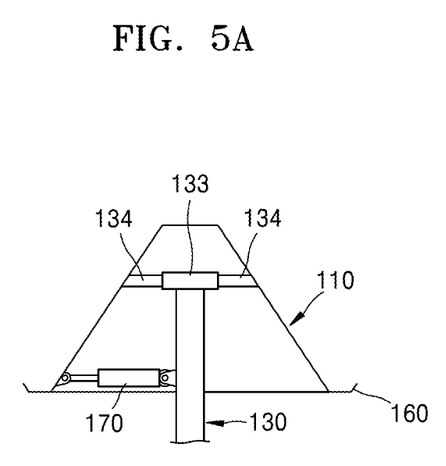
FIG. 5A is a side view of a docking portion according to an embodiment.
Figure 5B:
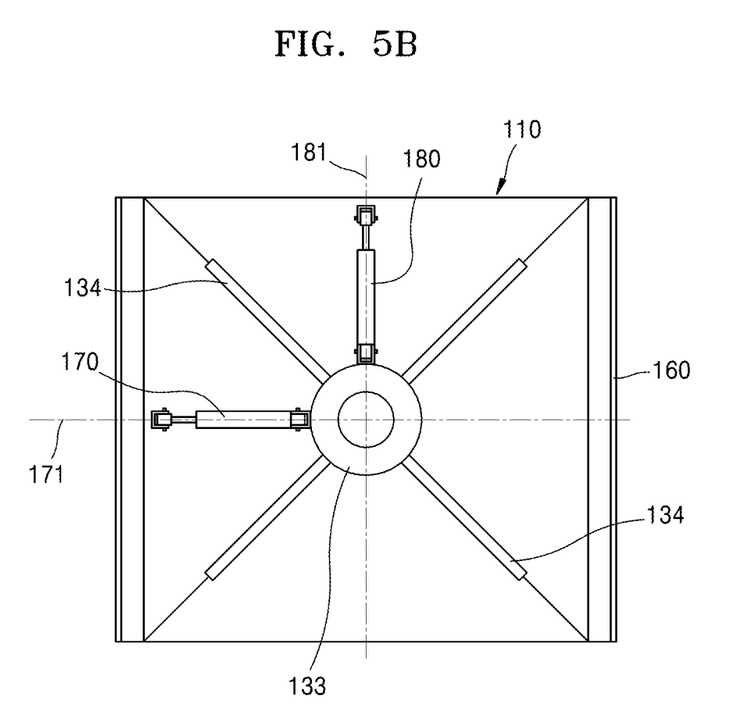
FIG. 5B is a plan view of a docking portion according to an embodiment.

Referring to FIGS. 5A and 5B, the connection joint 133 may be provided at the upper portion of the moving portion 132 and may be configured to support the connection shaft 134, and the connection shaft 134 may be configured to connect the connection joint 133 with the docking portion 110. When the docking portion 110 and the landing portion 120 have the truncated quadrangular pyramidal shape, four connection shafts 134 may be provided.

As described above, the moving portion 132 may be connected with the docking portion 110 through the connection joint 132 and the connection shaft 134, and because the docking portion 110 is connected with the moving portion 132, the docking portion 110 may be configured to upwardly and downwardly move according to the movement of the moving portion 132.

Referring to FIG. 4, a landing guidance sensor 150 configured to transmit a guidance signal to the drone 10 may be provided above the docking portion 110, according to an embodiment. The landing guidance sensor 150 may be configured to transmit a guidance signal to the drone 10, and the drone 10 may be configured to recognize an upper position of the docking portion 110 through the guidance signal generated by the landing guidance sensor 150.

As the drone 10 may recognize the upper position of the docking portion 110 through the guidance signal generated by the landing guidance sensor 150, the landing portion 120 may be accurately mounted on the docking portion 110.

According to an embodiment, the guidance signal generated by the landing guidance sensor 150 may include various signals which may be recognized by the drone 10. Also, when the docking portion 10 has the truncated quadrangular pyramidal shape, the landing guidance sensor 150 may be provided on an upper surface of the docking portion 110 having the truncated quadrangular pyramidal shape.

Referring to FIG. 4, a detachment prevention bump 160 extending in an outer direction of the docking portion 110 and having an upwardly inclined end may be provided at an outer portion of the docking portion 110. The detachment prevention bump 160 may extend in the outer direction of the docking portion 110 to form a flat surface, and the end of the detachment prevention bump 160 may have an upwardly inclined surface.

When the landing portion 120 is mounted on the docking portion 110, the detachment prevention bump 160 may be configured to prevent the detachment of the landing portion 120 and align the landing portion 120.

In detail, when the landing portion 120 is mounted on the docking portion 110 in an inclined state, the landing portion 120 may be guided to move along the upwardly inclined surface of the detachment prevention bump 160, so that the landing portion 120 may be aligned in the docking portion 110. Based on this configuration, when the landing portion 120 is mounted on the docking portion 110, the detachment of the landing portion 120 may be prevented.

Figure 6:
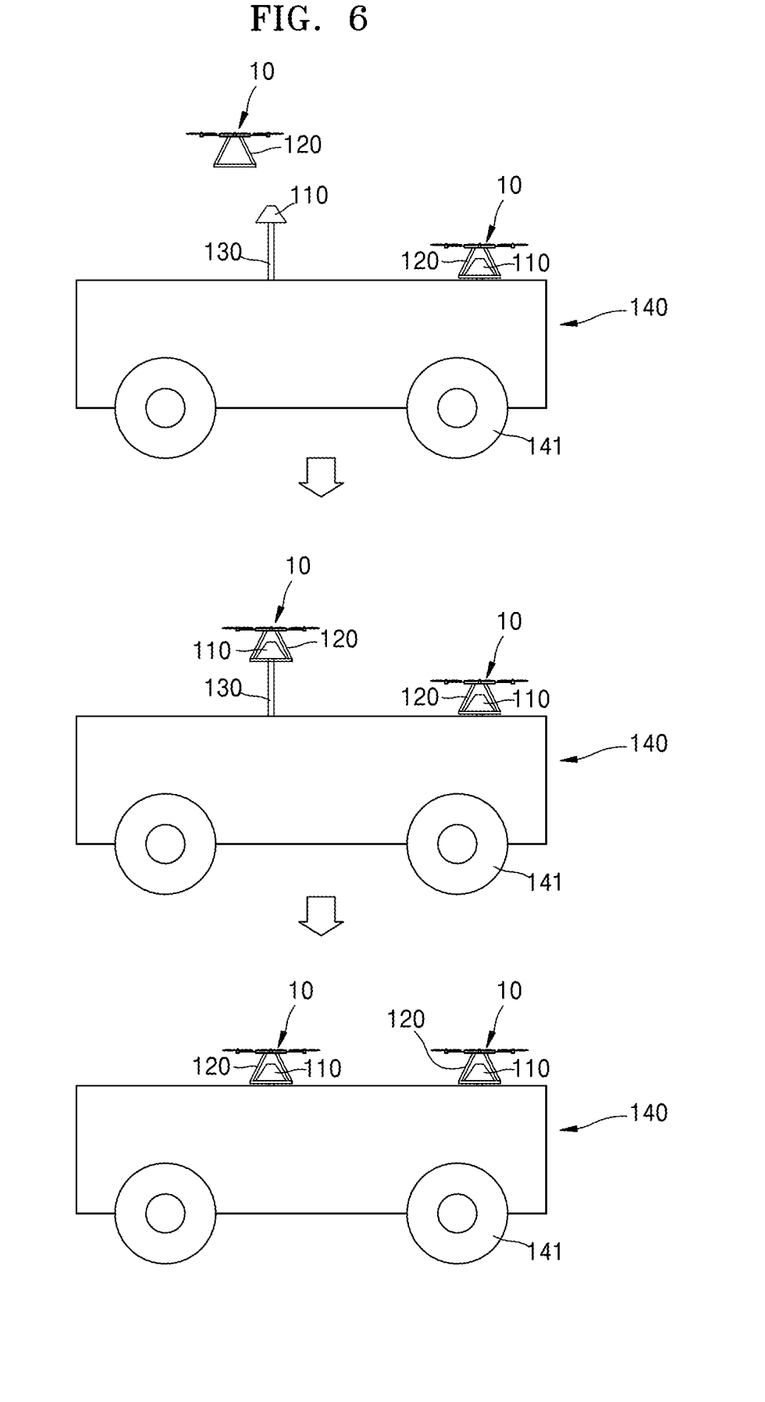
FIG. 6 is a diagram showing a process in which a docking portion is formed in a landing pad that is movable, and a drone is landed on the docking portion, according to an embodiment.
Figure 7:
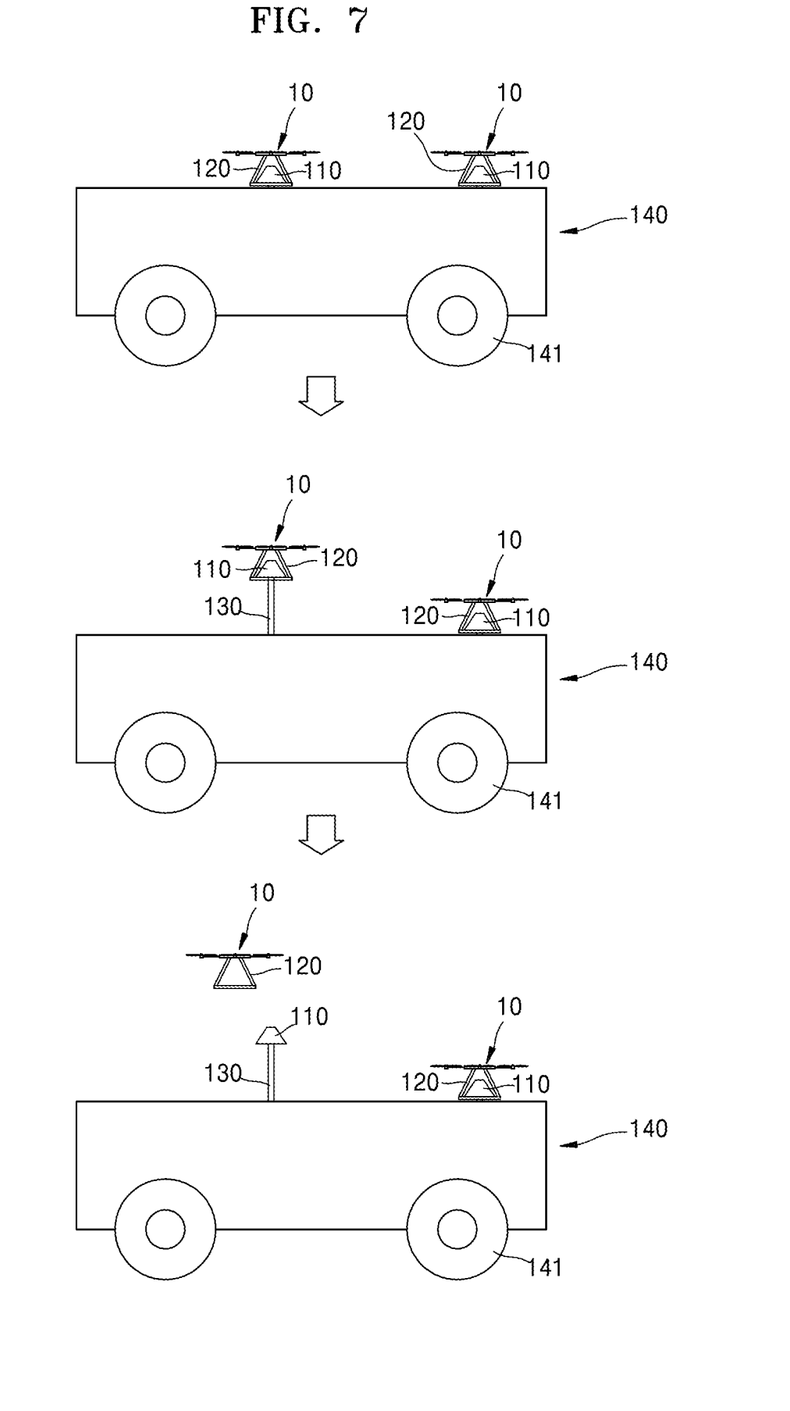
FIG. 7 is a diagram showing a process in which a docking portion is formed in a landing pad that is movable, and a drone is allowed to take off from the docking portion, according to an embodiment.

Referring to FIGS. 6 and 7, the drone docking/landing system according to an embodiment may include the landing pad 140 to which the connection portion 130 is coupled. The landing pad 140 may be coupled with the connection portion 130 connected with the docking portion 110, and the landing pad 140 may be coupled with the connection portion 130 provided in a multiple number.

When the connection portion 130 is coupled to the landing pad 140, the docking portion 110 may be mounted on the landing pad 140. According to an embodiment, the landing pad 140 may include a movable object, such as a vehicle or a vessel including a wheel 141.

The landing pad 140 may be provided at a portion of the movable object, such as the vehicle or a vessel, and because the connection portion 130 may be coupled to the landing pad 140, the docking portion 110 may be mounted on the movable object, such as the vehicle or the vessel.

According to an embodiment, the connection portion 130 may be configured to upwardly and downwardly move with respect to the landing pad 140, and because the docking portion 110 may be connected with the connection portion 130, the docking portion 110 may be configured to upwardly and downwardly move with respect to the landing pad 140.

Here, the fixed portion 131 of the connection portion 130 may be fixedly mounted on the landing pad 140, and the moving portion 132 of the connection portion 130 may be configured to upwardly and downwardly move with respect to the landing pad 140.

The docking portion 110 may be mounted to be capable of an upward and downward movement with respect to the landing pad 140, through the connection portion 130. As the docking portion 10 may be mounted to be capable of the upward and downward movement with respect to the landing pad 140, the drone 10 may be allowed to take off and land with minimized effects of peripheral obstacles.

When the landing pad 140 is provided at a movable point, such as a vehicle or a vessel, the drone 10 may perform take-off and landing through the following process. Referring to FIG. 6, to land the drone 10, the docking portion 10 may be configured to move to an upper position of the landing pad 140 through the connection portion 130.

As the docking portion 110 moves to the upper position, the landing portion 120 of the drone 10 may be configured to land on the docking portion 110 without being affected by peripheral obstacles.

When the landing portion 120 is mounted on the docking portion 110, the docking portion 110 may be configured to move to a lower position of the landing pad 140, and the drone 10 may be kept.

Referring to FIG. 7, to have the drone 10 take off, the docking portion 110 may be configured to move to the upper position of the landing pad 140 through the connection portion 130. As the docking portion 110 moves to the upper position, the drone 10 may perform take-off without being affected by peripheral obstacles.

As described above, because the docking portion 110 may be configured to upwardly and downwardly move with respect to the landing pad 140, through the connection portion 130, the drone 10 may be allowed to take-off and land without being affected by peripheral obstacles.

According to the drone docking/landing system according to an embodiment, the docking portion 110 may be mounted on the landing pad 140 through the connection portion 130, and thus, the drone 10 may be allowed to stably take off and land, without an additional device for lashing (fixing) or aligning the drone 10.

When a landing pad is mounted on a vehicle or a vessel, where there is an external movement, a drone may be detached from the landing pad due to the external movement, and to prevent the detachment, the landing pad mounted on the vehicle or the vessel according to the related art may require an additional lashing (fixing) or aligning device for lashing (fixing) or aligning the drone.

However, according to the drone docking/landing system according to an embodiment, the drone 10 may be landed through the docking portion 110 and the landing portion 120 that have a shape of a polygonal pyramid, a truncated polygonal pyramid, a cone, or a truncated cone, and thus, the detachment of the drone 10 may be prevented, even when an external movement occurs.

Therefore, according to the drone docking/landing system according to an embodiment, the drone 10 may be configured to stably perform take-off and landing, even when an additional lashing (fixing) or aligning device is not used.

In addition, according to the drone docking/landing system according to an embodiment, the docking portion 110 may be mounted on the landing pad 140 through the connection portion 130 capable of an upward and downward movement with respect to the landing pad 140, and thus, a space for take-off and landing of the drone 10, the space not having effects of obstacles, may be obtained.

Also, referring to FIGS. 6 and 7, according to the drone docking/landing system according to an embodiment, the docking portion 110 may be mounted on the landing pad 140 through the connection portion 130, and thus, the docking portion 110 may be mounted on the landing pad 140 by using an area less than an area of the drone 10. Accordingly, the drone docking/landing system may be minimized and may have a reduced weight.

The drone docking/landing system according to an embodiment may include a first actuator 170 and a second actuator 180, the first actuator 170 and the second actuator 180 being capable of rotating an inclination of the docking portion 110.

The first actuator 170 may be configured to rotate the inclination of the docking portion 110 based on a first axis 171 extending in a direction parallel with a plane formed by a lower surface of the docking portion 110, and the second actuator 180 may be configured to rotate the inclination of the docking portion 110 based on a second axis 181 extending in a direction parallel with the plane formed by the lower surface of the docking portion 110. Here, the first axis 171 and the second axis 181 may extend in directions perpendicular to each other.

The docking portion 110 may be configured to rotate the inclination in a roll direction and a pitch direction through the first actuator 170 and the second actuator 180. When the docking portion 110 is mounted on the landing pad 140 through the connection portion 130, the docking portion 110 may be mounted to be inclined due to an inclination formed in the landing pad 140.

The first actuator 170 and the second actuator 180 may be configured to rotate the inclination of the docking portion 110 to obtain the horizontality of the docking portion 110. Even when the inclination is formed in the landing pad 140, the inclination of the docking portion 110 may be rotated by using the first actuator 170 and the second actuator 180, and thus, the docking portion 110 may be horizontally mounted.

According to an embodiment, a gyro sensor may be provided in the first actuator 170 and the second actuator 180. When the gyro sensor is provided in the first actuator 170 and the second actuator 180, an inclination of the docking portion 110 may be automatically rotated to maintain the horizontality, even when the inclination is formed at an outer portion of the docking portion 110.

The drone docking/landing system according to an embodiment may have the following effects.

According to the drone docking/landing system according to an embodiment, the landing portion having a horned or a pyramidal shape may be provided at a lower portion of the drone, and the landing portion of the drone may be mounted and aligned on the docking portion having a horned or a pyramidal shape, and thus, the drone may be configured to stably perform take-off and land.

Also, according to the drone docking/landing system according to an embodiment, the drone may be allowed to take off and land through the docking portion having the horned or the pyramidal shape, and the docking portion may be mounted on the landing pad through the connection portion, a height of which is adjustable, and thus, the landing system may be miniaturized and may have a reduced weight. Also, the drone may be allowed to take off and land through an adjustable height of the docking portion, and thus, effects of peripheral obstacles may be minimized.

In addition, according to the drone docking/landing system according to an embodiment, the landing portion having the horned or the pyramidal shape may be mounted on the docking portion having the horned or the pyramidal shape, and thus, the drone may be lashed without an additional device, after the drone is completely landed, and a horizontality maintaining device of the landing system may be miniaturized in a vehicle or a vessel where there is a movement.

The disclosure relates to a drone docking/landing system for having a drone stably take off and land by providing a landing portion having a horned or a pyramidal shape at a lower portion of the drone and mounting and aligning the landing portion of the drone on a docking portion having a horned or a pyramidal shape.

Also, according to the disclosure, the drone may be configured to take off and land through the docking portion having the horned or the pyramidal shape, and the docking portion may be connected with a landing pad through a connection portion, a height of which is adjustable, and thus, the landing system may be miniaturized and may have a reduced weight. Also, because the drone may be allowed to take off and land through an adjusted height of the docking portion, effects of peripheral obstacles may be minimized.

In addition, according to the disclosure, the landing portion having the horned or the pyramidal shape may be mounted on the docking portion having the horned or the pyramidal shape, and thus, after the drone is completely landed, the drone may be lashed without an additional device, and a horizontality maintaining device of the landing system may be miniaturized in a vehicle or a vessel where there is a movement.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by one of ordinary skill in the art that various changes in form and details may be made therein without departing from the spirit and scope as defined by the following claims.

What is claimed is:

1. A drone docking and landing docking/landing system comprising:
   a docking portion having a shape of any one of a polygonal pyramid, a truncated polygonal pyramid, a cone, and a truncated cone and being configured to dock a drone;
   a first actuator configured to rotate an inclination of the docking portion with respect to a first axis extending in a direction parallel with a plane formed by a lower surface of the docking portion; and
   a second actuator configured to rotate the inclination of the docking portion with respect to a second axis extending in a direction parallel with the plane formed by the lower surface of the docking portion,
   wherein the first axis and the second axis are perpendicular to each other.

2. The drone docking and landing system of claim 1, further comprising a landing portion mounted at a lower portion of the drone, having a lower portion of the landing portion that is open, into which the docking portion is inserted, and having an empty inner space,
   wherein the landing portion has a shape of any one of a polygonal pyramid, a truncated polygonal pyramid, a cone, and a truncated cone, wherein the shape corresponds to the shape of the docking portion so that the docking portion is inserted into the landing portion.

3. The drone docking and landing system of claim 2, wherein the docking portion has a truncated quadrangular pyramidal shape, and
   the landing portion has a truncated quadrangular pyramidal shape, a lower portion of the landing portion of which is open, so that the docking portion is inserted into the landing portion.

4. The drone docking and landing system of claim 2, wherein a size of a lower surface of the docking portion is the same as a size of a lower surface of the open lower portion of the landing portion.

5. The drone docking and landing system of claim 1, further comprising a connection portion having a rod shape and connected with the docking portion.

6. The drone docking and landing system of claim 5, wherein the connection portion comprises a fixed portion fixed at a designated point and a moving portion configured to upwardly and downwardly move with respect to the fixed portion, and
   the docking portion is connected with the moving portion and is configured to upwardly and downwardly move with respect to the fixed portion.

7. The drone docking and landing system of claim 6, wherein a connection joint is provided at an upper portion of the moving portion, and
   a connection shaft is provided at an outer portion of the connection joint, the connection shaft having a bar shape and connecting the connection joint with the docking portion.

8. The drone docking and landing system of claim 5, further comprising a landing pad to which the connection portion is coupled.

9. The drone docking and landing system of claim 8, wherein the connection portion in a multiple number are coupled to the landing pad, and the landing pad is configured to be movable.

10. The drone docking and landing system of claim 8, wherein
    the connection portion is configured to upwardly and downwardly move with respect to the landing pad, and
    the docking portion is connected with the connection portion and is configured to upwardly and downwardly move with respect to the landing pad.

11. The drone docking and landing system of claim 1, wherein a landing guidance sensor configured to transmit a guidance signal to the drone is provided at an upper portion of the docking portion.

12. The drone docking and landing system of claim 1, wherein a detachment prevention bump extending in an outer direction of the docking portion and having an upwardly inclined end is provided at an outer portion of the docking portion.

* * * * *